Sept. 26, 1961  A. J. G. PEROTTI ET AL  3,001,772
CARBURETOR
Filed Aug. 17, 1959  3 Sheets-Sheet 1
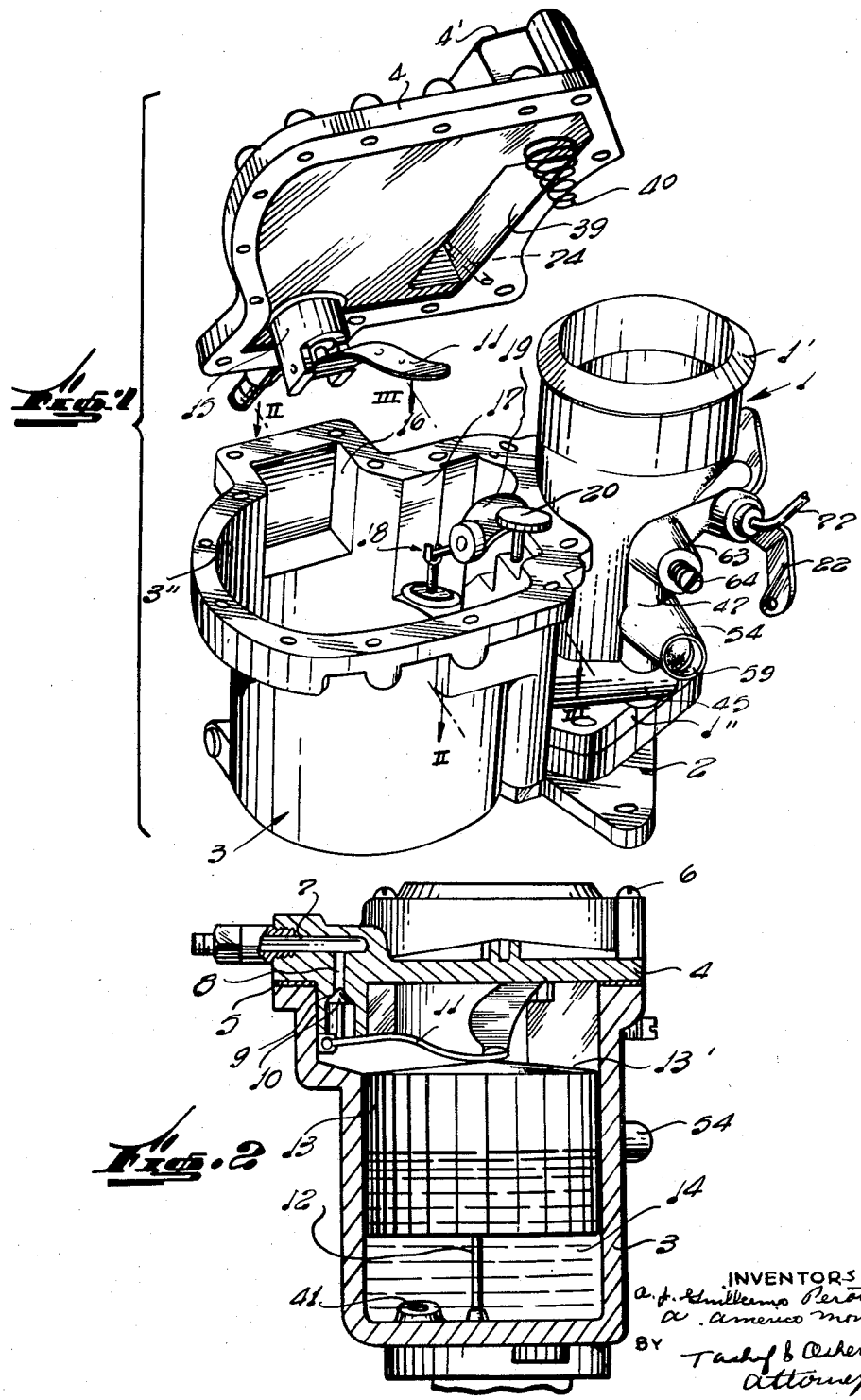

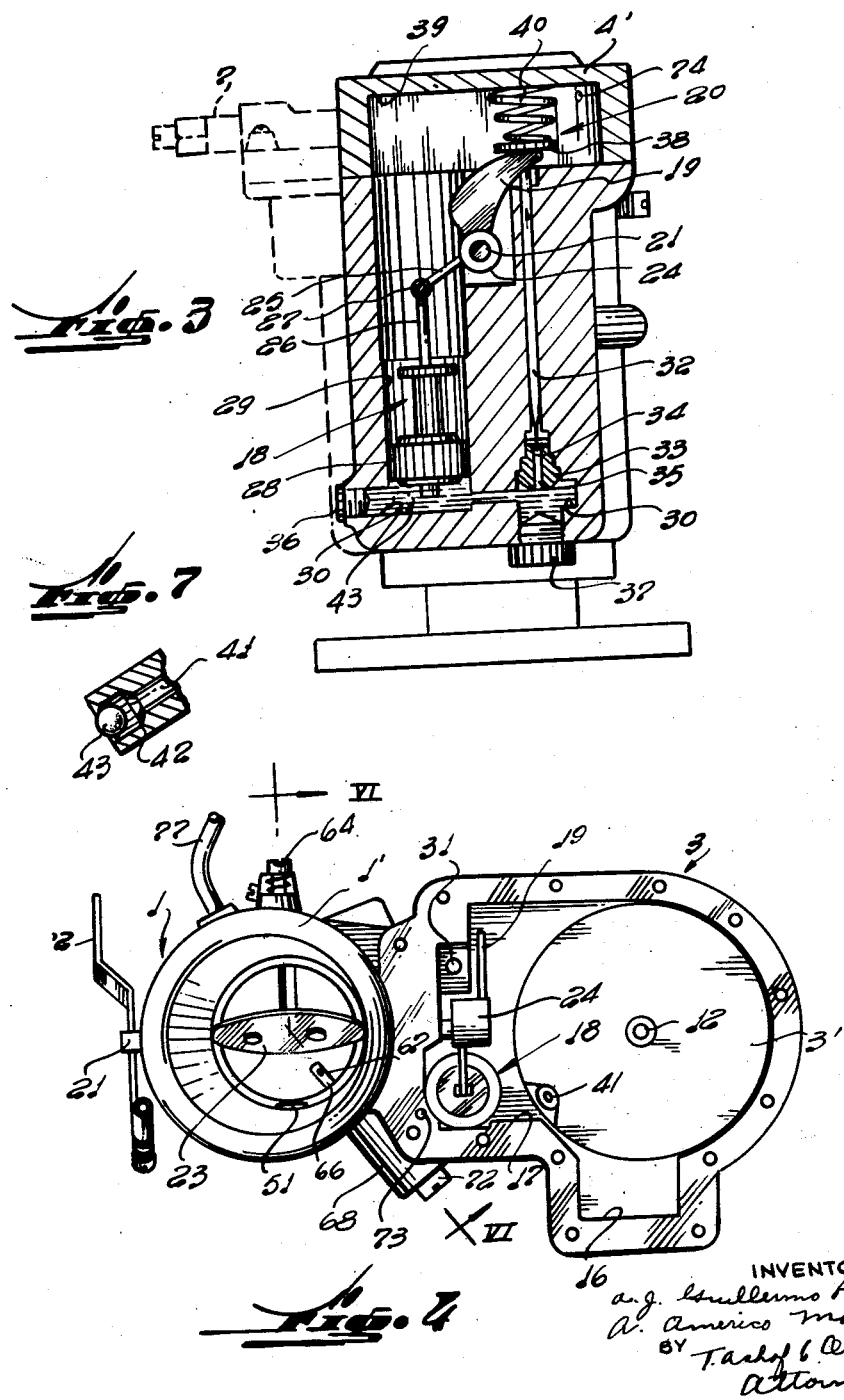

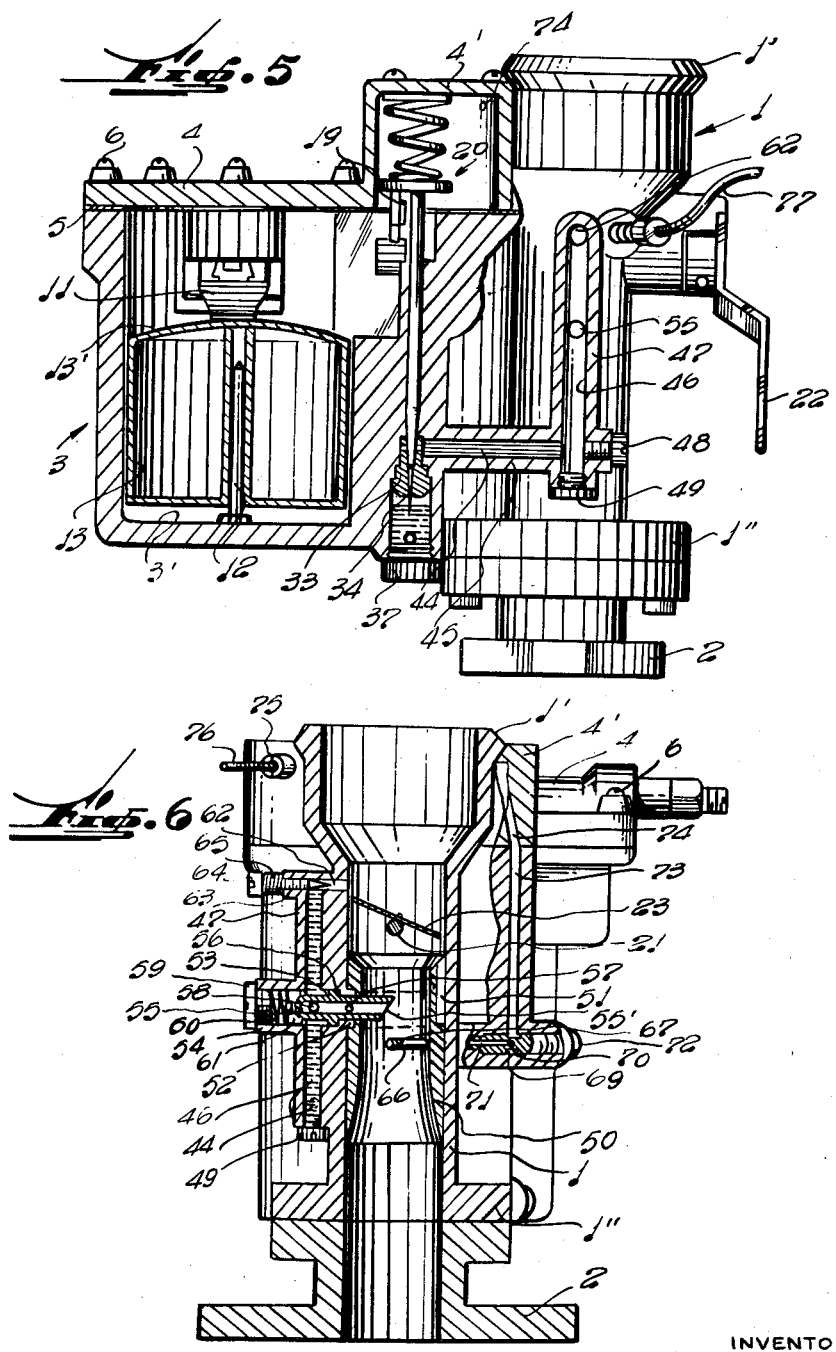

3,001,772
CARBURETOR

Antonio Juan Guillermo Perotti, 1058 Amenbar St., Buenos Aires, Argentina, and Arturo Americo Monacci, 2722(61) Angel J. Murga St., Necochea, Argentina
Filed Aug. 17, 1959, Ser. No. 834,159
8 Claims. (Cl. 261—34)

This invention refers to a carburetor for internal combustion engines of the ignition type.

Within the art of carburetors it is an aim to obtain a homogeneous mixture of air and fuel. In most of the carburetors this is not achieved in a substantially perfect way due to the fact that the throttle valve is located below the fuel injector nozzle with regard to the inlet manifold, so that part of the more or less well atomized fuel mixture condenses on the disc of said throttle valve.

In addition, in these known carburetors the float chamber is at atmospheric pressure, so that a fuel pump has to feed all the fuel required towards the carburetor.

The present invention provides an arrangement where the fuel mixture of fuel and air is atomized below the throttle valve, so that there is no obstacle of the above mentioned type which will vary the homogeneity of the mixture and thus the output power supplied by the engine is increased.

In addition, the float chamber is maintained at subatmospheric pressure, whereby the fuel pump will have to operate only under very severe conditions, while under normal circumstances the fuel will enter the float chamber simply by suction due to the subatmospheric pressure condition residing in said float chamber.

Furthermore, the carburetor of the present invention is a very simple structure and has a very small number of movable parts and valves with regard to the orthodox arrangements, so that disassembling and cleaning is much simpler. It may be added that cleaning does not require that the carburetor be dismounted from the engine.

More particularly, the carburetor for internal combustion engines of the ignition type according to the present invention comprises a tube including a Venturi member and having a lower end adapted to be connected to the intake manifold of an engine and an upper end adapted to be connected to an airfilter, a fuel float chamber having a fuel inlet, a throttle valve including an axis pin and a disc mounted on said axis pin, said throttle valve being housed in said tube, a first fuel injector nozzle in said tube and ending in said Venturi member between said throttle valve and said lower end, said first fuel injector nozzle being connected to said float chamber, a second fuel injector nozzle connected to said float chamber and ending in said tube above said axis pin and within the control range of said disc, and a vacuum connection between said Venturi member and said float chamber.

It is thus an object of the present invention to provide a carburetor for internal combustion engines adapted to provide an homogeneous fuel mixture which passes straight into the inlet manifold without having to by-pass any throttle valve arrangement.

Another object of the invention is to provide a carburetor, the float chamber of which works at subatmospheric pressure.

Still a further object is to provide a carburetor with a minimum of movable parts and which may be cleaned without having to dismount the carburetor from the engine.

These and further objects and advantages of the present invention will become more apparent during the course of the following description, wherein by way of example reference is made to a specific embodiment shown in the accompanying drawings, wherein:

FIGURE 1 is a perspective view of the carburetor according to the present invention with the cover of the float chamber dismounted and the float thereof eliminated.

FIGURE 2 is a longitudinal section through the float chamber somewhat along line II—II of FIGURE 1, but with the cover mounted on the float chamber and the float housed therein.

FIGURE 3 is likewise a longitudinal section similar as FIGURE 2, but somewhat along the line III—III of FIGURE 1 and again with the cover mounted on the float chamber.

FIGURE 4 is a top plane view of FIGURE 1 with the cover and float being dismounted.

FIGURE 5 is a longitudinal section through the float chamber and the feeding arrangement of the fuel injector nozzles of the carburetor, whilst the tube including the Venturi member is not shown in section.

FIGURE 6 is a longitudinal section of the tube including the Venturi member and accessories of the carburetor.

FIGURE 7 is a detail in longitudinal section of a ball valve of the carburetor. As may be appreciated in FIGURE 1, the carburetor of the present invention consists of a tube 1 the lower end 1″ of which is mounted on a flange 2 which is to be connected to the inlet manifold of the engine (not shown), while the upper end 1′ of said tube 1 is to be connected to an air filter (likewise not shown). The fuel float chamber 3 is integral with said tube 1 and comprises a cover 4 which is fit with the interposition of a gasket 5 (see FIGURE 5) and a number of screws 6 onto said fuel float chamber, thereby defining an airtight unit. The cover 4 (see FIGURE 2) comprises a fuel inlet 7 which is to be connected to the fuel tank (not shown) and which is connected to a branch 8 defining a valve seat 9 in which a conical check valve 10 is housed and controlled by means of a pivoted lever 11 (see also FIGURE 1) so as to control the flow of fuel into the fuel float chamber 3, as is well-known in the art.

As may be best seen in FIGURE 5, the bottom 3′ of the float chamber 3 supports a guiding pin 12 on which a float 13 is slidably mounted. The top portion 13′ of the float 13 is in abutting contact, as may be better seen in FIGURE 2, with the free end of the pivoted lever 11, so that when the fuel float chamber 3 is empty as shown in FIGURE 5, the check valve 10 is unseated (not shown), while when the fuel 14 (see FIGURE 2) has reached a pre-determined level the float 13 is raised, whereby the pivoted lever 11 raises the check valve 10, which is seated on the valve seat 9.

The arrangement of the check valve 10 is housed in a projection 15 (see FIGURE 1) integral with the cover 4, and said projection 15 in turn snugly fits in a first recess 16 arranged to this effect in the side wall 3″ of the fuel float chamber 3. The side wall 3″ comprises a second recess 17 of rather complicated shape which houses the mechanism of an accelerating pump 18 and a cam 19, which operates a needle valve 20. This arrangement is controlled by an axis pin 21 (FIGURE 3) which forms part of the accelerating means. More particularly, as may be better seen in FIGURE 4, the axis pin 21 passes through the tube 1, and a lever 22 is mounted on the outwardly projecting portion of said axis pin 21. Said lever 22 is to be connected to the accelerator pedal (not shown) of the motor-car.

A disc 23 is mounted on said axis pin 21 within tube 1 and defines in combination therewith a throttle valve.

The cam 19 is integral with a bushing 24 (see FIGURE 3) which is actually mounted on said axis pin 21 and said bushing 24 is further integral with an arm 25 to which a stem 26 is pivoted by means of a pivot 27, and which stem is integral with a piston 28 slidably housed in a cylinder 29 defined by a bore arranged within the side wall 3″ of the fuel chamber 3. In the position shown in FIGURE 3, the piston 28 has almost reached almost its lowermost position and therefore pumped into channel 30 an extra amount of fuel which is necessary when the engine is to be accelerated, as is already well-known in the art.

A vertical bore 31 (FIGURE 4) exists within the side wall 3″ and adjacent to the second recess 17. A needle stem 32 (see FIGURE 3) forming part of the needle valve 20 is slidably arranged in said bore 31. The bore 31 ends in an enlarged lower portion wherein a valve seat plug 33 is screwed and which co-operates with a needle 34 integral with said needle stem 32. The valve seat plug 33 comprises a bore 35 which in turn ends into the channel 30, which has a side plug 36 and a bottom plug 37 which facilitate the cleaning of said channel 30. The upper end of the needle stem 32 ends in a plate 38 which rests on the cam 19, so that upon operating the lever 22 (see FIGURE 4) the needle 34 and needle stem 32 will meter the amount of fuel which may pass through the bore 35 of the valve seat 33, as will be better understood hereinafter.

The cover 4 comprises a raised portion 4′ (see also FIGURE 5) defining a dome 39 (see also FIGURES 1 and 3) wherein a compression spring 40 is mounted, the free end of which abuts against the plate 38 and tends to press the needle valve 20 downwardly to close the valve seat plug 33 and thereby its bore 35.

In FIGURE 4 the float 13 has been dismounted and thus the bottom 3′ is visible and within said bottom the inlet opening 41 of a ball valve 42 (see FIGURE 7) is visible which ends into the channel 30 as indicated by the outlet opening 43 in FIGURE 3. The valve 42 is a one-way valve which allows the passage of the fuel from the fuel float chamber 3 into the channel 30, but not vice-versa.

Turning now to FIGURE 5, it will be appreciated that above the valve seat 33, the bore 31 is connected to a horizontal interconnecting branch 44 defined in an outer rib 45 (see also FIGURE 1). This horizontal branch 44 is connected by its other end to a vertical feeding duct 46 bored into rib 47. For cleaning purposes, the horizontal interconnecting branch 44 is provided with a dismountable plug 48, and likewise the vertical feeding duct 46 is provided with a dismountable plug 49.

As may be seen in FIGURE 6, the Venturi member 50 is housed within the central portion of tube 1. The lower portion of said Venturi member 50 snugly fits into said tube 1, while the upper portion thereof defines a longitudinal channel 51 between the outer wall of said Venturi member 50 and the inner wall of said tube 1. As may likewise be appreciated from FIGURE 6, the lower end of said channel 51 ends into an outer annular horizontal recess 52 arranged in an intermediate portion and which thus defines a ring chamber between the outer wall of said Venturi member 50 and the inner wall of said tube 1, which ring chamber 52 is connected to said longitudinal channel 51, and is thus able to receive air therefrom, as will be better understood later on. In front of said ring chamber 52 and within the side wall of said tube 1 there is an outer recess 53. The rib 47 comprises at its intermediate height a hollow projection 54 which enables to mount therethrough and by-passing the vertical feeding duct 46 a first injector nozzle 55 having an outer stop ring 56 which enters in abutting contact with the outer recess 53 and passes through the ring chamber 52 into the Venturi member 50. The first injector nozzle 55 comprises a first ring of bores 57 which is housed within the ring chamber 52 and a second ring of bores 58 which is arranged within the vertical feeding duct 46. A plug 59 closes said hollow projection 54 and by means of a spring 60 and a block 61 said first injector nozzle 55 is spring urged into said Venturi member 50.

The upper end of the vertical feeding duct 46 is connected to a horizontal bore which defines a second injector nozzle 62 which ends into the tube 1 above the axis pin 21 and within the control range of the disc 23 defining the throttle valve, as will be explained later. Rib 47 comprises opposite to the second injector nozzle 62 a hollow projection 63 in which an adjustment screw 64 is screwed, with the interposition of a compression spring 65, as is already known as such in the art. The adjustment screw 64 enables the metering of the amount of fuel which as a maximum may be ejected through the second injector nozzle 62 which operates as an air intake when the engine is idling.

The throttle valve, and more particularly the axis pin 21 is so located that when the disc 23 closes the tube 1, as shown in full lines in FIGURE 6, the periphery of said disc 23 is located below the second injector nozzle 62. Nozzle 62 is arranged at a position at 180° with regard to the longitudinal channel 51 which, it may already be stated, when said disc 23 is in the closed position, is likewise blocked from the outside.

In addition, it may be appreciated that the first injector nozzle 55 has a slightly biased mouth 55′ in such a way that the upper portion thereof defines in a certain way a shield against incoming air from the upper end 1′ of the tube 1, whereby turbulence at the fuel injection point of the nozzle 55 in avoided. Opposite the first injector nozzle 55 and slightly below the latter, there is a vacuum tube 66, the inlet 67 of which is upwardly directed. Said vacuum tube 66 is housed in a hollow projection 68 (see also FIGURE 4) integral with the tube 1. The vacuum tube 66 comprises a circular outer recess 69 having a plurality of perforations 70 connected to the inlet 67 through a longitudinal bore 71. A plug 72 closes the hollow projection 68.

Within the side wall of the tube 1 there is an upstanding bore 73 which is connected to the circular outer recess 69 at one end, and to a further bore 74 arranged within the raised portion 4′ of the cover 4. Bore 74 ends into the dome 39, as may be best appreciated in FIGURES 1, 3, 5 and 6. From the foregoing it will be apparent to those skilled in the art, that the vacuum existing within the Venturi member 50 is transmitted to the float chamber 3 through said vacuum tube 66 and bores 73 and 74.

In addition the raised portion 4′ of the cover 4, as may be seen in FIGURE 6, is provided with an air inlet controlled by a needle valve 75, the needle of which is housed within said valve and may be controlled by a cable 76 so that the amount of air which may be sucked into the float chamber 3 from outside may be controlled for instance, from the dashboard (not shown), to operate as a choke. Since the structure of such a needle valve is well-known in the art and is substantially identical to that described in connection with the valve seat plug 33 and needle 34, it is not considered necessary to specifically show this detail.

Finally, as may be seen in FIGURES 1 and 5, there is a control tube 77 connected to the tube 1 so as to control the distributor (not shown) of the engine, as is likewise already well-known in the art.

As to the operation of the carburetor of the present invention, assuming that the engine has been started and is idling and that the throttle valve, and more particularly the disc 23 is in the full line position, of FIGURE 6 and that the cam 19 is in its lowermost position whereby the needle 34 (see FIGURE 5) almost completely closes the valve seat plug 33, the suction produced by the engine will act on the first injector nozzle 55 to draw in the minimum amount of fuel necessary for idling at the same time as an additional amount of air is supplied through the second injector nozzle 62 into said first injector nozzle 55. The fuel is supplied from the fuel float chamber 3 through the ball valve 42 into the channel 30, and from channel 30 through the bore 35 of the valve seat plug 33 into the horizontal interconnecting branch 44 and therefrom into the vertical feeding duct 46.

At the same time air is withdrawn from the float chamber 3 through the dome 39 into the bore 74 and there from through bore 73 and vacuum tube 66, so that the depression residing within the float chamber 3 increases, which will facilitate the additional fuel supply through the fuel inlet 7 as fuel is being consumed by the engine. Since the end of bore 74 is within the dome 33, splashing of fuel within float chamber 3 will not reach bore 74.

If the power to be generated by the engine is to be a little increased, the lever 22 is operated, whereby the axis pin 21 is so rotated that the accelerating pump 18 is operated and the needle valve 20 is further opened and the disc 23 of the throttle valve is likewise opened to adopt the position shown in dotted lines in FIGURE 6. In that event several changes happen. It is now possible that air enters the longitudinal channel 51 to pass through the outer annular horizontal recess or ring chamber 52 by the first ring of bores 57 into the first nozzle 55, which in addition receives fuel from vertical feeding duct 46 in a more or less large amount depending on the suction exerted by the engine on the biased mouth 55′. Thus, since primary air enters the nozzle 55 through bores 57, within the nozzle, a first mixture of air and fuel takes place before entering the Venturi member 50 wherein the final mixture will be produced. Furthermore, additional fuel will be supplied through the second injector nozzle 62. When the throttle valve is still further opened toward the maximum, since a rather large amount of air enters through the upper end 1′, the second injector nozzle 62 becomes operative, and fuel coming from the lower portion of said feeding duct 46 enters into said first injector nozzle 55 through the second ring of bores 58. It will be appreciated that the mixture of fuel and air coming from the longitudinal channel 51 and which enters the Venturi member 50 enters directly through the flange 2 to the intake manifold without having to by-pass a throttle valve as in the orthodox type of carburetors.

The air-inlet needle valve 75 enables to control the amount of additional air which may be allowed to enter the float chamber 3 which will be graduated in accordance with the specific circumstances such as height above sea-level, and in the case of a motor-car, whether the same is climbing up a hill, etc.

The atomization of the fuel is thus much better, as in the known arrangement, which enables to obtain a better output for the same amount of fuel with regard to the known arrangements.

Tests have furthermore shown that the maximum speed of a motor-car is increased at the same time as the consumption of fuel is reduced. For instance, a test has been made with a jeep for a distance over 470 miles; first with an orthodox type of carburetor, the maximum speed of said vehicle was 69 m.p.h., and the consumption was 20 litres per 69 miles, as an average. The same distance was then covered with the same engine with the carburetor of the present invention, giving as a maximum speed 79.5 m.p.h., and the consumption was 20 litres per 81 miles, as an average.

It will be evident to those skilled in the art that several modifications may be introduced within the structure above described and will still fall within the scope of the present invention as long as they are within the scope of the appendant claims.

We claim:

1. A carburetor for internal combustion engines of the ignition type, said carburetor comprising a tube including a Venturi member and having a lower end adapted to be connected to the intake manifold of an engine and an upper end adapted to be connected to an air filter, a fuel float chamber having a fuel inlet, a throttle valve including an axis pin and a disc mounted on said axis pin, said throttle valve being housed in said tube, a first fuel injector nozzle in said tube and ending in said Venturi member between said throttle valve and said lower end, said first fuel injector nozzle being connected to said float chamber, a second fuel injector nozzle connected to said float chamber and ending in said tube above said axis pin and within the control range of said disc, a vacuum connection between said Venturi member and said float chamber, and valve means for controlling the flow of fuel from said float chamber to said injector nozzles and connected to said throttle valve.

2. A carburetor for internal combustion engines of the ignition type, said carburetor comprising a tube having an inner wall, a lower end adapted to be connected to the intake manifold of an engine and an upper end adapted to be connected to an air filter, a Venturi member comprising a lower portion, an intermediate portion and an upper portion, said Venturi member having an outer wall and being sealingly connected to said inner wall of said tube by its lower portion, a longitudinal channel in the upper portion of said outer wall of said Venturi member, an annular recess in the outer wall of said intermediate portion and connected to said longitudinal channel, a throttle valve including an axis pin and a disc mounted on said axis pin, said throttle valve being housed in said tube above said Venturi member and the axis pin thereof being substantially parallely arranged to said longitudinal channel, a first fuel injector nozzle mounted in said tube and passing through said annular recess into said Venturi member, said first fuel injector nozzle having at least one opening connecting said fuel injector nozzle with said annular recess, a fuel float chamber having a fuel inlet, said first fuel injector nozzle being connected to said float chamber, a second fuel injector nozzle connected to said float chamber and ending in said tube above said axis pin and within the control range of said disc, a vacuum connection between said Venturi member and said float chamber, one-way valve means arranged between said float chamber and said injector nozzles, needle valve means arranged between said one-way valve means and said injector nozzles for controlling the amount of fuel supplied to said injector nozzles, said needle valve means being connected to said throttle valve.

3. A carburetor as claimed in claim 2, wherein said fuel float chamber comprises a dome portion arranged above the maximum fuel level, a controllable air inlet valve arranged in said dome for controlling the vacuum within said float chamber.

4. A carburetor as claimed in claim 2, wherein said first fuel injector nozzle ends into said Venturi member opposite said longitudinal channel and said first fuel injector nozzle and said second fuel injector nozzle are arranged in the same vertical plane.

5. A carburetor as claimed in claim 4, wherein said first fuel injector nozzle and said second fuel injector nozzle are connected to a single vertical feeding duct controlled by said needle valve means.

6. A carburetor as claimed in claim 3, wherein said vacuum connection ends in the dome of said float chamber.

7. A carburetor for internal combustion engines of the ignition type, said carburetor comprising a tube having an inner wall and integral with a float chamber, said tube having a lower end adapted to be connected to the intake manifold of an engine and an upper end adapted to be connected to an air filter, a Venturi member comprising a lower portion, an intermediate portion and an upper portion, said Venturi member having an outer wall and being sealingly connected to said inner wall of said tube by its lower portion, a longitudinal channel in the upper portion of said outer wall of said Venturi member, an annular recess in the outer wall of said intermediate portion and connected to said longitudinal channel, a throttle valve including an axis pin and a disc mounted on said axis pin, said throttle valve being housed in said tube above said Venturi member and the axis pin thereof being substantially parallely arranged to said longitudinal channel, a bottom in said float chamber, a channel in said bottom, a one way valve connecting said float chamber with said channel, an accelerating pump in said float chamber and connected to said channel, said accelerating pump being controlled by said axis pin, a vertical feeding duct in said tube, a first fuel injector nozzle connected to said vertical feeding duct, mounted in said tube and passing through said annular recess into said Venturi member, a second fuel injector nozzle connected to said vertical feeding duct and ending in said tube above said axis pin and within the control range of said disc, a needle valve controllably connected said channel with said vertical feeding duct, said needle valve being controlled by said axis pin, a vacuum tube housed in said Venturi member below said first injector nozzle and connected to said float chamber, said first injector nozzle being furthermore connected to said annular recess, a fuel inlet including valve means for said float chamber, a float in said float chamber and controllably connected to said last mentioned valve means and an at will controllable air inlet valve connected to said float chamber for controlling the vacuum therein.

8. A carburetor as claimed in claim 7, wherein plugs are provided for said channel, said vertical feeding duct, said needle valves and said first and second fuel injector nozzles, which plugs are dismountable from outside and enable access to said channel, vertical feeding duct, needle valve and said first and second fuel injector nozzles for cleaning purposes.

References Cited in the file of this patent
UNITED STATES PATENTS

| | | |
|---|---|---|
| 2,315,717 | Liebing et al. | Apr. 6, 1943 |
| 2,320,012 | Riall | May 25, 1943 |
| 2,322,991 | Wunsch et al. | June 29, 1943 |
| 2,849,216 | Perotti et al. | Aug. 6, 1958 |